United States Patent
Hu et al.

(10) Patent No.: US 8,200,919 B2
(45) Date of Patent: Jun. 12, 2012

(54) STORAGE DEVICE WITH SELF-CONDITION INSPECTION AND INSPECTION METHOD THEREOF

(75) Inventors: Chia-Ming Hu, Taipei County (TW); Chun-Yu Hsieh, Taichung City (TW)

(73) Assignee: Transcend Information, Inc., NeiHu Dist., Taipei (TW)

( * ) Notice: Subject to any disclaimer, the term of this patent is extended or adjusted under 35 U.S.C. 154(b) by 752 days.

(21) Appl. No.: 12/265,417

(22) Filed: Nov. 5, 2008

(65) Prior Publication Data
US 2009/0125759 A1 May 14, 2009

(30) Foreign Application Priority Data
Nov. 9, 2007 (TW) ................................ 96142491 A

(51) Int. Cl.
*G06F 11/00* (2006.01)
(52) U.S. Cl. .......... 711/156; 711/103; 711/154; 714/48; 714/54; 714/704; 714/723
(58) Field of Classification Search .................. None
See application file for complete search history.

(56) References Cited

U.S. PATENT DOCUMENTS

| | | | | |
|---|---|---|---|---|
| 6,000,006 A | * | 12/1999 | Bruce et al. | 711/103 |
| 6,078,946 A | * | 6/2000 | Johnson | 709/200 |
| 2003/0041298 A1 | * | 2/2003 | Bruner et al. | 714/763 |
| 2003/0058762 A1 | * | 3/2003 | Schultz et al. | 369/47.13 |
| 2003/0135793 A1 | * | 7/2003 | Craig et al. | 714/42 |
| 2007/0181078 A1 | * | 8/2007 | McFarland | 119/720 |
| 2007/0198786 A1 | * | 8/2007 | Bychkov et al. | 711/154 |
| 2008/0072118 A1 | * | 3/2008 | Brown et al. | 714/763 |
| 2009/0077429 A1 | * | 3/2009 | Yim et al. | 714/54 |

FOREIGN PATENT DOCUMENTS

TW  200745855  12/2007

* cited by examiner

*Primary Examiner* — Brian Peugh
*Assistant Examiner* — Nicholas Simonetti
(74) *Attorney, Agent, or Firm* — Winston Hsu; Scott Margo

(57) ABSTRACT

A storage device with self-status detection and an inspection method thereof are provided. The storage device includes a plurality of storage areas (i.e., block tables), a plurality of memory blocks, and a status detection unit. The storage areas respectively have a corresponding weight value, and the addresses of memory blocks which have the same number of error correct codes (ECCs) are recorded in the same storage area. The status detection unit obtains a status of the storage device according to the number of addresses of the memory blocks recorded in a storage area and the corresponding weight value of the storage area.

14 Claims, 4 Drawing Sheets

| | A | B | C | D | Weight value |
|---|---|---|---|---|---|
| 0bit Error | 2 records | 2 records | 5 records | 3 records | x5 |
| 1bit Error | 1 records | 2 records | 0 records | 2 records | x4 |
| 2bit Error | 1 records | 1 records | 0 records | 0 records | x3 |
| 3bit Error | 1 records | 0 records | 0 records | 0 records | x2 |
| 4bit Error | 0 records | 0 records | 0 records | 0 records | x1 |
| Second sub operation value | 19 | 21 | 25 | 23 | |

| Storage area (n-bit) | Memory block | Weight value | Sub operation value |
|---|---|---|---|
| 110 (0bit) | 122 124 126 | x5 | 15 |
| 112 (1bit) | 128 | x4 | 4 |
| 114 (2bit) | 130 132 | x3 | 6 |
| 116 (3bit) | 134 | x2 | 2 |
| 118 (4bit) | 136 138 | x1 | 2 |
| 120 Disabled block area | 140 | x0 | 0 |

FIG. 3A

| Storage area (n-bit) | Memory block | Weight value | Sub operation value |
|---|---|---|---|
| 110 (0bit) | 122 124 126 128 134 136 138 | x5 | 35 |
| 112 (1bit) | 130 132 | x4 | 8 |
| 114 (2bit) | 140 | x3 | 3 |
| 116 (3bit) | | x2 | 0 |
| 118 (4bit) | | x1 | 0 |
| 120 Disabled block area | | x0 | 0 |

FIG. 3B

STORAGE DEVICE WITH SELF-CONDITION INSPECTION AND INSPECTION METHOD THEREOF

CROSS-REFERENCE TO RELATED APPLICATION

This application claims the priority benefit of Taiwan application serial no. 96142491, filed on Nov. 9, 2007. The entirety of the above-mentioned patent application is hereby incorporated by reference herein and made a part of specification.

BACKGROUND OF THE INVENTION

1. Field of the Invention

The present invention generally relates to a status detection method, and more particularly, to a status detection method for a storage device.

2. Description of Related Art

A non-volatile memory can retain the data stored therein for a long time even when no power is supplied. Thus, along with the widespread of technical products, different types of non-volatile memories, such as read-only memory (ROM), programmable read-only memory (PROM), electrically erasable and programmable read-only memory (EEPROM), and flash memory, have been broadly applied to various products. In addition, other non-volatile memories, such as magnetoresistive random access memory (MRAM), phase-change memory (PRAM), and ferroelectric random access memory (FeRAM), are also commercialized in small quantities. Presently, flash memory is broadly applied to computer devices (for example, the writing systems for network boxes, screens, and memory cards, and the input/output systems of computers) due to its many advantages, such as vibration proofness, low power consumption, small volume, light weight, and fast access speed, etc.

The storage area of a non-volatile memory, such as a flash memory, contains many blocks for storing data. These memory blocks are arranged as an array therefore are also referred as a memory block array, and each of the memory blocks has a storage space of a specific capacity. Data writing, reading, and erasing are performed to a memory electrically. Thus, some bits in the memory may become erroneous after the memory is used for some time, and these erroneous bits are referred as error bits. In conventional techniques, when an error bit is found in a memory block, the error bit can be corrected through bit correction, and the corrected bit is marked as an error correct bit or an error correct code (ECC).

Conventionally, memory blocks are managed according to the number of ECCs in these memory blocks. For example, the addresses of memory blocks in a flash memory are respectively recorded in a normal block area and a disabled block area. When it is determined that the number of ECCs in a memory block is lower than a predetermined value (N-Bit ECC; N is greater than or equal to 1), the address of the memory block is recorded (for example, classified) into the normal block area. Accordingly, the memory blocks corresponding to the addresses recorded in the normal block area can be accessed normally. Contrarily, when it is determined that the number of ECCs in a memory block is higher than the predetermined value, which means an error may occur if data is stored in the memory block, the address of the memory block is recorded into the disabled block area. When next time a data is stored into the flash memory, the data will not be stored in the memory blocks corresponding to the addresses recorded in the disabled block area. When the disabled block area has no more available space, the flash memory is locked so that new data cannot be written therein anymore.

Generally speaking, the more memory blocks have ECCs in a flash memory storage device, the lower status the flash memory storage device has. However, a general user has no way to obtain information about the status of a storage device.

SUMMARY OF THE INVENTION

Accordingly, the present invention is directed to a status detection method for a storage device. The status detection method allows a user to obtain a status of the storage device.

The present invention is also directed to a storage device with self-status detection, wherein the storage device has a plurality of storage areas (i.e., block tables).

The present invention provides a status detection method for a storage device. A plurality of memory blocks is provided in the storage device. In addition, a plurality of storage areas is also provided in the storage device, wherein each of the storage areas stores the addresses of memory blocks which have the same number of error correct codes (ECCs). In addition, a corresponding weight value is assigned to each of the storage areas, and a status of the storage device is calculated according to the positions of the storage areas in which the addresses of the memory blocks are recorded.

According to an embodiment of the present invention, the step of calculating the status includes following steps. A total number of addresses of the memory blocks in the storage device is multiplied by the highest weight value to obtain an ideal value. In addition, the number of addresses of the memory blocks recorded in each of the storage areas is multiplied by the corresponding weight value of the storage area to obtain a plurality of first sub operation values, and all the first sub operation values are added up to obtain an real value. The real value is divided by the ideal value to obtain the status.

According to an embodiment of the present invention, an initial value is obtained according to an original value assigned to each of the memory blocks when the storage device is manufactured and the corresponding weight value of the storage area in which the address of the memory block is recorded. Besides, the number of addresses of memory blocks recorded in each of the storage areas is multiplied by the corresponding weight value of the storage area to obtain a plurality of first sub operation values, and all the first sub operation values are added up to obtain an real value. The real value is divided by the initial value to obtain the status.

Additionally, according to the present invention, the number of erasing or writing the address of each of the memory blocks may also be detected to obtain a plurality of erase/write values.

According to an embodiment of the present invention, the step of obtaining the status further includes following steps. The total number of addresses of the memory blocks is multiplied by the highest weight value and then by a predetermined value to obtain an ideal value. Each time when an erasing operation or a writing operation is performed, a plurality of record values is obtained according to the corresponding weight values of the storage areas in which the addresses of the memory blocks are recorded. Different record values of the address of each of the memory blocks are respectively multiplied by the corresponding weight value, and the products obtained are added up to obtain a plurality of second sub operation values, and the second sub operation values are added up to obtain the real value. The real value is divided by the ideal value to obtain the status of the storage device. In addition, an initial value is obtained according to an original value assigned to each of the memory blocks when the storage device is manufactured and the corresponding weight value of the storage area in which the address of the memory block is recorded. The real value is divided by the initial value to obtain the status of the storage device.

According to an embodiment of the present invention, the storage areas have different data access rights, and the higher weight value a storage area has, the higher data access right the addresses of memory blocks recorded in the storage area have. In addition, the less ECCs a memory block has, the higher weight value the storage area in which the address of the memory block is recorded has.

According to an embodiment of the present invention, the storage device is a non-volatile memory, and the non-volatile memory may be a flash memory.

The present invention provides a storage device with self-status detection. The storage device includes a plurality of storage areas, a plurality of memory blocks, a plurality of addresses of the memory blocks, and a status detection unit. The storage areas respectively have a corresponding weight value. The memory blocks are used for storing data. The addresses of memory blocks which have the same number of ECCs are recorded into the same storage area. The status detection unit calculates a status of the storage device according to the number of addresses of the memory blocks recorded in each of the storage areas and the corresponding weight value of the storage area.

According to an embodiment of the present invention, the storage areas can be grouped into a plurality of normal storage areas and a disabled block area. The numbers of ECCs in the memory blocks which have their addresses recorded in the normal storage areas are all smaller than or equal to a predetermined bit value. The numbers of ECCs in the memory blocks which have their addresses recorded in the disabled block area are all greater than the predetermined bit value. Accordingly, data to be stored in the storage device is not stored in the disabled block area.

In the present invention, an real value is calculated according to the number of addresses of memory blocks recorded in each storage area and the corresponding weight value of the storage area, and the real value is compared with an initial value/ideal value to obtain a status of the storage device, so that a user can understand the status of the storage device. Moreover, according to the present invention, the number of writing and erasing operations can be detected to obtain a plurality of erase/write values, and an real value can be calculated according to these erase/write values and then compared with the ideal value. Thereby, a user can understand the status of the storage device based on foregoing calculation result.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A is a statistical chart of error correct codes (ECCs) according to an embodiment of the present invention.

FIG. 3B is a statistical chart of ECCs when a storage device is manufactured according to an embodiment of the present invention.

DESCRIPTION OF THE EMBODIMENTS

Figure 1:
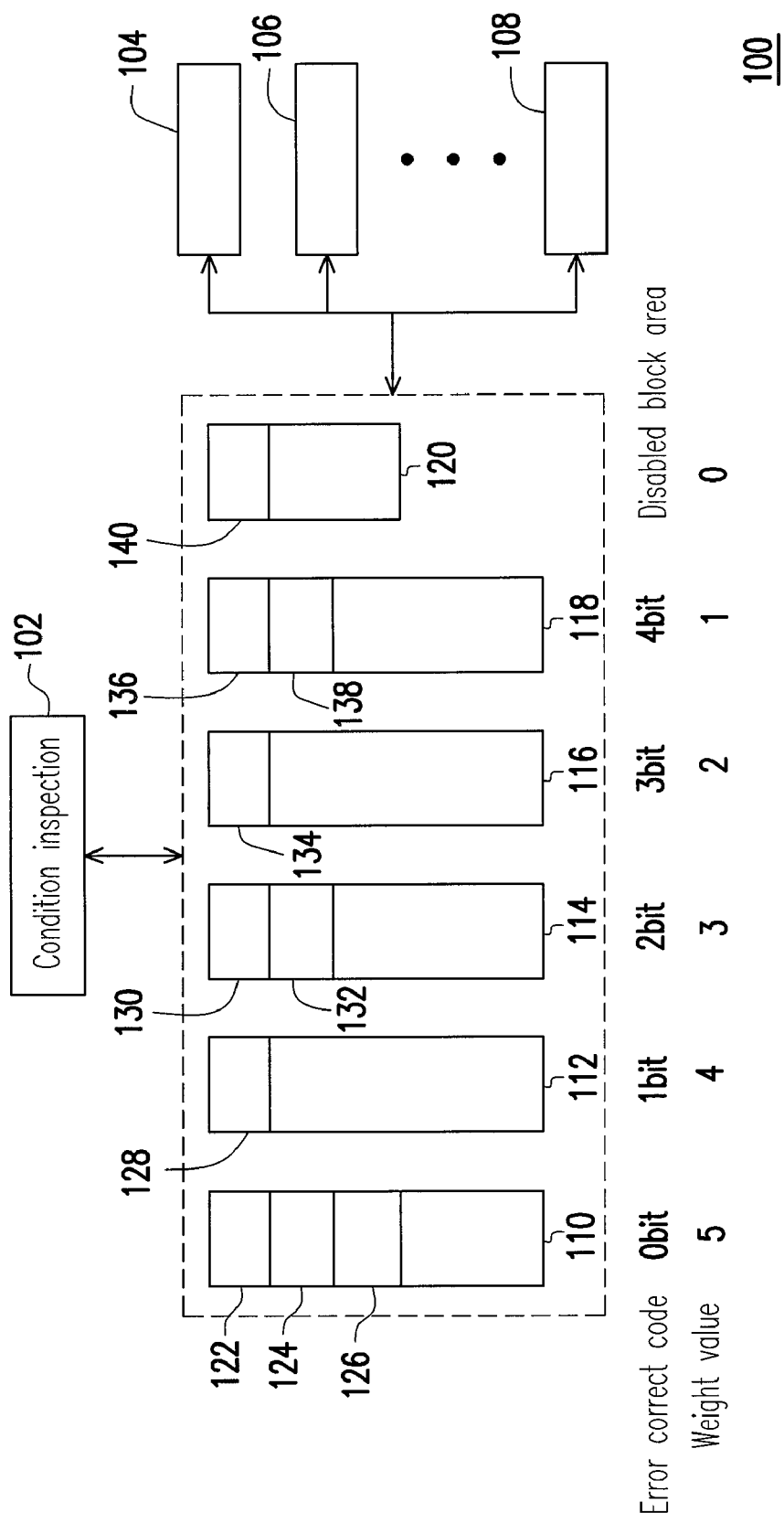
FIG. 1 is a block diagram illustrating the internal function of a storage device with self-status detection according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating the internal function of a storage device with self-status detection according to an embodiment of the present invention. Referring to FIG. 1, in the present embodiment, the storage device 100 (for example, a flash memory storage device) includes a status detection unit 102, memory blocks 104, 106, and 108, a plurality of storage areas 110, 112, 114, 116, 118, and 120, and addresses 122, 124, 126, 128, 130, 132, 134, 136, 138, and 140 of the memory blocks. The status detection unit 102 is coupled to all the storage areas 110, 112, 114, 116, 118, and 120. In addition, the addresses 122, 124, 126, 128, 130, 132, 134, 136, 138, and 140 of each of the memory blocks can be recorded into corresponding storage areas.

The memory blocks 104, 106, and 108 are used for storing data, and the addresses of those memory blocks which have the same number of error correct codes (ECCs) are recorded into the same storage area. For example, all the addresses 122, 124, and 126 of the memory blocks recorded in the storage area 110 have 0 bit ECC, and the address 128 of the memory block has 1 bit ECC therefore is recorded into the storage area 112. The storage areas are assigned with corresponding weight values according to the ECC numbers thereof. In the present embodiment, the less ECCs a storage area has, the higher weight value is assigned to this storage area, and the higher weight value of a storage area is, the higher data access right the storage area has. Accordingly, because the storage area 110 has the least ECCs, the weight value thereof is assigned the highest value, such as 5, and so on. The status detection unit 102 calculates the status of the storage device according to the number of addresses of the memory blocks recorded in the storage area and the corresponding weight value of the storage area.

Even though in the present embodiment, each storage area has a corresponding weight value, the present invention is not limited thereto. It should be understood by those having ordinary knowledge in the art that the weight value of a storage area can be determined according to the real requirement.

Additionally, in the present embodiment, the storage areas can be categorized into normal storage areas 110, 112, 114, 116, and 118 and a disabled block area 120. In the normal storage areas 110, 112, 114, 116, and 118, the numbers of ECCs in the addresses (for example, the addresses 122, 124, 126, 128, 130, 132, 134, 136, and 138) of the memory blocks are all smaller than or equal to a predetermined value (for example, 4). On the other hand, the number of ECCs in the address 140 of the memory block in the disabled block area 120 is greater than the predetermined value such that data to be stored in the storage device will not to be stored in the address 140 of the memory block recorded in the disabled block area 120.

Figure 2:
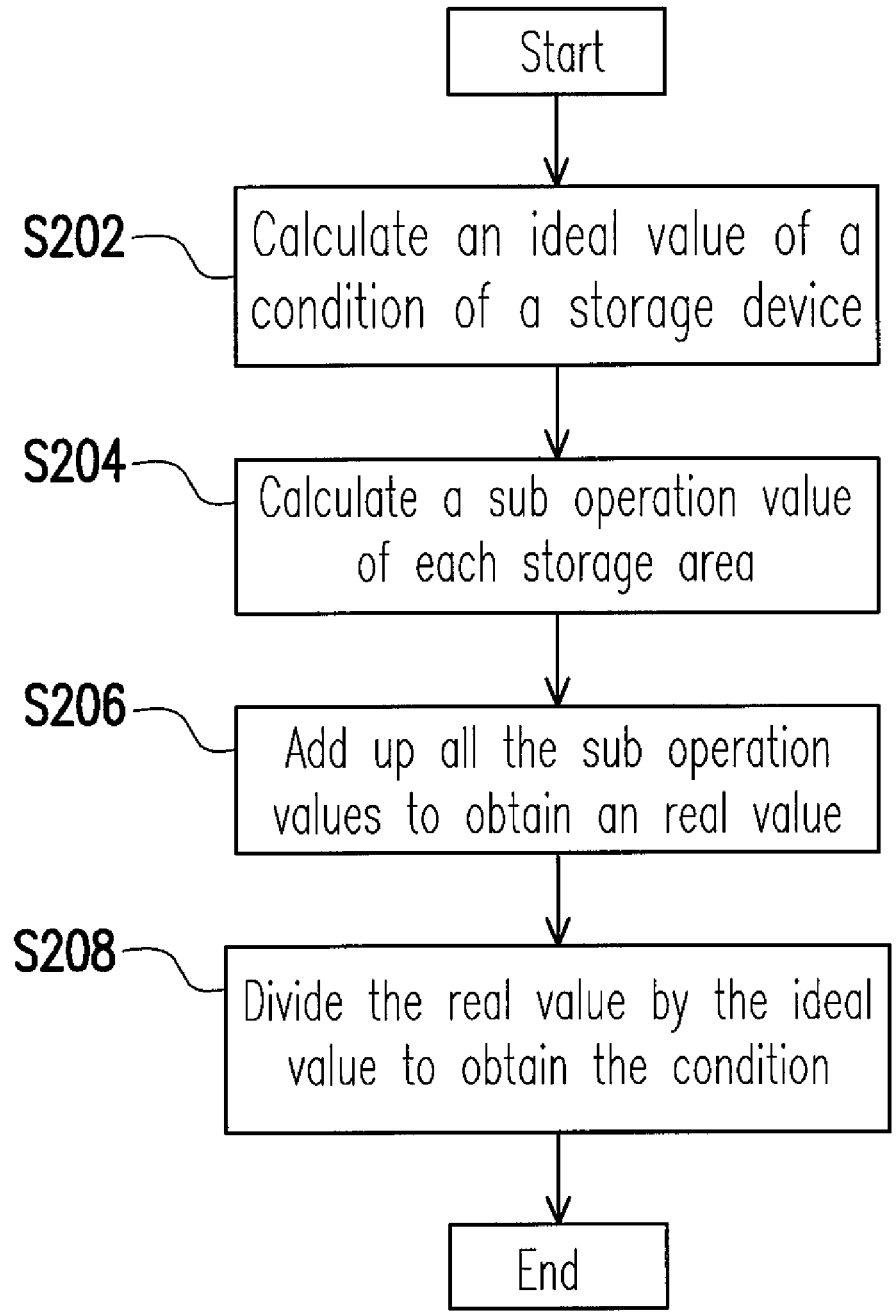
FIG. 2 is a flowchart of a status detection method according to an embodiment of the present invention.

FIG. 2 is a flowchart of a status detection method according to an embodiment of the present invention. FIG. 3A is a statistical chart of ECCs according to an embodiment of the present invention. Referring to both FIG. 2 and FIG. 3A, when the status detection unit 102 calculates the status of the storage device, as in step S202, the status detection unit 102 calculates an ideal value of the status of the storage device. The method for calculating the ideal value is to multiply a total number of addresses of the memory blocks in the storage device by the highest weight value. As shown in FIG. 3A, there are totally 10 addresses 122, 124, 126, 128, 130, 132, 134, 136, 138, and 140. Assuming that ideally, there is no ECC in any address of the memory block, then by multiplying the total number of addresses by the highest weight value (for example, 5), an ideal value 50 is obtained.

Next, an real value of the status is calculated. In step S204, the sub operation value of each storage area is calculated. In the present embodiment, the method for calculating the sub operation value of each storage area is to multiply the number of addresses of memory blocks recorded in the storage area by the corresponding weight value of the storage area. As shown in FIG. 3A, the weight value of the storage area 110 is assumed to be 5, and three addresses 122, 124, and 126 are recorded therein. Thus, the sub operation value of the storage area 110 is 3*5=15. Besides, the weight value of the storage area 112 is assumed to be 4, and the address 128 is recorded therein. Thus, the sub operation value of the storage area 112 is 1*4=4. Accordingly, the sub operation values of the storage areas 114, 116, 118, and 120 are respectively 6, 2, 2, and 0.

Thereafter, in step S206, all the sub operation values are added up to obtain the real value. Accordingly, the real value is obtained as 29 by adding up foregoing sub operation values 15, 4, 6, 2, 2, and 0. Next, in step S208, the real value is divided by the ideal value to obtain the status of the storage device. As described above, in the present embodiment, the real value of the status of the storage device is 29 and the ideal value thereof is 50. Accordingly, in the present embodiment, the status of the storage device is 29÷50=58%.

Besides calculating the status of the storage device by using the real value and the ideal value, in the present embodiment, the status of the storage device may also be calculated by using the real value and an initial value. Herein the initial value is the value of the storage device when the storage device is just manufactured, and due to the affection of environment or process, the initial value is lower than the ideal value. Thus, in the present embodiment, an initial value is obtained according to an original value assigned to each memory block when the storage device is just manufactured and the corresponding weight value of the storage area in which the address of the memory block is recorded. This operation will be described in detail with reference to FIG. 3B. FIG. 3B is a statistical chart of ECCs when a storage device is manufactured according to an embodiment of the present invention. In the ideal situation, the addresses of all the memory blocks are recorded in the storage area 110. However, due to the affection of the environment or process, the addresses of some memory blocks contain ECCs, such as the addresses 130, 132, and 140 in FIG. 3B. Accordingly, the corresponding weight values of the storage areas are respectively multiplied by the number of addresses recorded in the storage area, and the products obtained are added up to obtain the initial value. As described above, the initial value is obtained as 7*5+4*2+3*1=46, and the status of the storage device is obtained by dividing the real value by the initial value as 29÷46=63.04%.

Figures 4, 5:
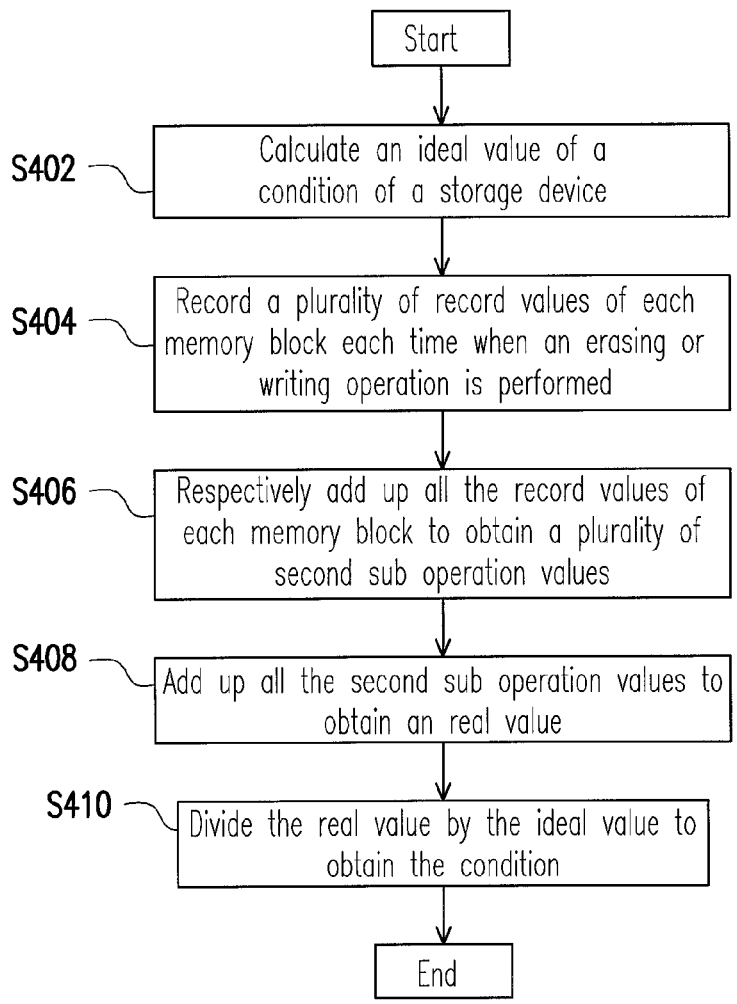
FIG. 4 is a flowchart of a status detection method according to an embodiment of the present invention.
FIG. 5 is a statistical chart of ECCs in memory blocks when operations are performed to the addresses of the memory blocks according to an embodiment of the present invention.

FIG. 4 is a flowchart of a status detection method according to an embodiment of the present invention. FIG. 5 is a statistical chart of ECCs in memory blocks when operations are performed to the addresses of the memory blocks according to an embodiment of the present invention. Referring to both FIG. 4 and FIG. 5, similar to the embodiment described above, in the status detection method of the present embodiment, an ideal value of the storage device status is calculated in step S402. The method for calculating the ideal value is to multiply a total number of addresses of memory blocks in the storage device by the highest weight value and then by a predetermined value of an operation number. The predetermined value is the number of writing and erasing operations performed. As shown in FIG. 5, the storage device has memory block addresses A, B, C, and D. Assuming that the address of each memory block has totally 5 operations, then the predetermined value is 5. In addition, in the present embodiment, the highest weight value is set to 5. Accordingly, in the present embodiment, the ideal value of the storage device is 4*5*5=100.

Next, in step S404, each time when an erasing or writing operation is performed, the corresponding weight value of the storage area in which the address of each memory block is recorded to obtain a plurality of record values. Step S404 will be explained with a memory block address A as an example. It is assumed that the memory block address A respectively has 2 records of 0-bit ECC, 1 record of 1-bit ECC, 1 record of 2-bit ECC, and 1 record of 3-bit ECC during the last five erasing and writing operations. Then, the memory block address A is recorded into the corresponding storage area according to the ECC number thereof each time when an erasing or writing operation is performed, wherein each storage area has a corresponding weight value. In the present embodiment, in step S404, the weight value of the storage area containing the memory block address A is recorded and served as a record value each time when an erasing or writing operation is performed. Thus, the record values obtained during the last five erasing and writing operations are 5, 5, 4, 3, and 2, and the other record values can be obtained accordingly.

After that, in step S406, all the record values of each memory block address are added up to obtain a plurality of second sub operation values. For example, the second sub operation value of the memory block address A is 5+5+4+3+2=19. In the present embodiment, the second sub operation values corresponding to the memory block addresses B, C, and D are respectively 21, 25, and 23. Next, in step S408, all the second sub operation values are added up to obtain the real value, namely, 19+21+25+23=88. Finally, in step S410, the real value is divided by the ideal value to obtain the status of the storage device. Based on foregoing parameters, in the present embodiment, the status of the storage device is 88÷100=88%.

As described above, in the present invention, addresses of memory blocks can be stored in appropriate storage areas according to the numbers of ECCs in these memory block addresses, and a corresponding weight value is assigned to each of the storage areas. Thereby, a status detection unit can record the error history of the storage device completely and calculates the status of the storage device based on the numbers of ECCs in the memory block addresses each time when an erasing or writing operation is performed. Thus, the present invention can be applied to predict addresses of invalid memory blocks so that the possibility of disabled storage device can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A status detection method for a storage device, comprising:
 providing a plurality of memory blocks for storing data in the storage device;
 providing a plurality of storage areas in the storage device, wherein addresses of the memory blocks having the same number of error bits are recorded into the same storage area;
 assigning a corresponding numerical weight value to each of the storage areas; and
 obtaining a status of the storage device according to the numerical weight value of the storage area in which the address of each of the memory blocks is recorded.

2. The status detection method according to claim 1, wherein the less error bits the memory block has, the higher numerical weight value the storage area in which the address of the memory block is recorded has.

3. The status detection method according to claim 2, wherein the step of obtaining the status comprises:
 multiplying a total number of the addresses of the memory blocks by the highest numerical weight value to obtain an ideal value;
 multiplying a number of addresses of the memory blocks recorded in each of the storage areas by the corresponding numerical weight value of the storage area to obtain a plurality of first sub operation values;
 adding up all the first sub operation values to obtain an real value; and
 dividing the real value by the ideal value to obtain the status.

4. The status detection method according to claim 2, wherein the step of obtaining the status comprises:
 multiplying a total number of the addresses of the memory blocks by the highest numerical weight value to obtain an ideal value, and obtaining an initial value according to an original value assigned to each of the memory blocks when the storage device is manufactured and the corresponding numerical weight value of the storage area in which the address of the memory block is recorded;
 multiplying a number of addresses of the memory blocks recorded in each of the storage areas by the corresponding numerical weight value of the storage area to obtain a plurality of first sub operation values;
 adding up all the first sub operation values to obtain an real value; and
 dividing the real value by the initial value to obtain the status.

5. The status detection method according to claim 1, further comprising:
 detecting a number of times each of the memory blocks have been erased or written, to obtain a plurality of erase/write values;
 recording the addresses of the memory blocks having the erase/write values equal to a predetermined value in the storage area in which the addresses of the memory blocks are recorded each time when the memory blocks are erased or written, and obtaining an real value; and
 obtaining the status of the storage device according to the real value.

6. The status detection method according to claim 5, wherein the step of obtaining the status comprises:
 multiplying a total number of the addresses of the memory blocks by the highest numerical weight value and then by the predetermined value to obtain an ideal value;
 each time when an erasing operation or a writing operation is performed, recording the corresponding numerical weight value of the storage area in which the address of each of the memory blocks is recorded to obtain a plurality of record values;
 respectively multiplying the different record values of the address of each of the memory blocks by the corresponding numerical weight value, and then adding up the multiplication results to obtain a plurality of second sub operation values;
 adding up the second sub operation values to obtain the real value; and
 dividing the real value by the ideal value to obtain the status.

7. The status detection method according to claim 5, wherein the storage device is a non-volatile memory.

8. The status detection method according to claim 7, wherein the non-volatile memory is a flash memory.

9. The status detection method according to claim 1, wherein the storage areas have different data access rights, and the higher numerical weight value of the storage area is, the higher data access right the storage area has.

10. A storage device with self-status detection, comprising:
 a plurality of memory blocks, for storing data;
 a plurality of storage areas, respectively having a corresponding numerical weight value;
 a plurality of addresses of the memory blocks, wherein addresses of the memory blocks having the same number of error bits are recorded into the same storage area; and
 a status detection unit, for obtaining a status of the storage device according to a number of addresses of the memory blocks recorded in each of the storage areas and the corresponding numerical weight value of the storage area.

11. The storage device according to claim 10, wherein the storage areas comprise:
 a plurality of normal storage areas, wherein the numbers of error bits in the addresses of the memory blocks recorded in each of the storage areas are all smaller than or equal to a predetermined bit value; and
 a disabled block area, wherein the numbers of error bits in the addresses of the memory blocks recorded in the disabled block area are all greater than the predetermined bit value such that data to be stored in the storage device is not stored in the memory blocks corresponding to the addresses recorded in the disabled block area.

12. The storage device according to claim 11, wherein the predetermined bit value is greater than or equal to 1.

13. The storage device according to claim 11, wherein the predetermined bit value is greater than or equal to 4.

14. The storage device according to claim 13, wherein the non-volatile memory is a flash memory.

* * * * *